(12) United States Patent
Sperber (10) Patent No.: US 10,451,395 B1
(45) Date of Patent: Oct. 22, 2019

(54) SPREAD, SPAN AND WHEEL ALIGNMENT GAUGE

(71) Applicant: RED-E-ROW PRODUCTS, LLC, South Daytona, FL (US)

(72) Inventor: Perry R Sperber, South Daytona, FL (US)

( * ) Notice: Subject to any disclaimer, the term of this patent is extended or adjusted under 35 U.S.C. 154(b) by 0 days.

(21) Appl. No.: 16/505,235

(22) Filed: Jul. 8, 2019

(51) Int. Cl.
*G01B 3/20* (2006.01)
*G01B 5/00* (2006.01)
*B63B 35/73* (2006.01)
*G01D 21/02* (2006.01)
*G01B 3/10* (2006.01)

(52) U.S. Cl.
CPC ............ *G01B 3/20* (2013.01); *G01B 5/0002* (2013.01); *B63B 35/73* (2013.01); *G01B 3/1084* (2013.01); *G01B 2003/1092* (2013.01); *G01D 21/02* (2013.01)

(58) Field of Classification Search
CPC ....................................... G01B 3/20
USPC .......................................... 33/613, 645, 464
See application file for complete search history.

(56) References Cited

U.S. PATENT DOCUMENTS

| | | | | |
|---|---|---|---|---|
| 368,995 A | * | 8/1887 | Dailey et al. ............ | G01B 3/56 33/464 |
| 661,539 A | * | 11/1900 | Krauss ..................... | G01B 3/30 33/562 |
| 1,183,977 A | * | 5/1916 | Hoefle ..................... | G01B 3/56 33/464 |
| 3,727,212 A | * | 4/1973 | Jones ....................... | B63B 21/22 340/986 |
| 3,863,594 A | * | 2/1975 | Gawthrop ................ | B60P 3/10 116/28 R |
| 4,096,636 A | * | 6/1978 | Little ....................... | G01B 5/255 33/203 |
| 4,554,624 A | * | 11/1985 | Wickham ................. | E01B 29/26 104/17.1 |
| 4,637,143 A | * | 1/1987 | Telles ...................... | G01C 21/20 33/1 SB |
| 4,872,267 A | * | 10/1989 | Anderton ................. | G01B 5/24 33/463 |
| 5,414,938 A | * | 5/1995 | Meek ....................... | B25H 7/02 33/452 |
| 6,341,013 B1 | * | 1/2002 | Battiti .................... | G01B 11/2755 356/139.09 |
| 6,973,739 B2 | | 12/2005 | Ewans | |
| 8,407,910 B2 | | 4/2013 | Ewans | |
| 2006/0035753 A1 | | 2/2006 | Baker | |
| 2009/0126208 A1 | * | 5/2009 | Suita ....................... | G01M 11/067 33/203.12 |
| 2013/0095711 A1 | | 4/2013 | Rubbo | |
| 2013/0263459 A1 | * | 10/2013 | Rabiner ................... | G01B 11/27 33/228 |

* cited by examiner

*Primary Examiner* — George B Bennett
(74) *Attorney, Agent, or Firm* — Lori Sandman

(57) ABSTRACT

The invention disclosed herein is a device, method of use and kit for measuring and precisely setting the dimensions in wheeled and tracked devices or vehicles. It is particularly well-suited for rowing boats and simulators thereof, including but not limited to sweep rowing and sculling watercraft. It introduces a novel gauge and process to adjust wheels within tracked environments to minimize friction and enhance equipment performance. Further, the device is capable of precise measurement of both spread and span dimensions in rowing watercraft to optimize rigging.

13 Claims, 4 Drawing Sheets

SPREAD, SPAN AND WHEEL ALIGNMENT GAUGE

CROSS-REFERENCE TO RELATED APPLICATIONS

Not applicable.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

The present invention relates to the field of measuring and measurement devices. Specifically, the invention comprises a device, system and method for measuring and precisely setting the dimensions in wheeled and tracked devices or vehicles, and is particularly well-suited for rowing boats and simulators thereof, including but not limited to sweep rowing and sculling watercraft.

Devices, machines and vehicles that include wheels operational within tracks require proper alignment of the tracks and wheels to optimize function, minimize friction and reduce wear-and-tear with use. In rowing watercraft, particularly when use includes racing or competitive rowing, precisely setting or rigging the various components to position them relative to each other is critical. Components including seats, oars and oarlocks, track, rail, wheels and related structures must be aligned to allow the force generated by the rower to be translated efficiently to motion of the watercraft.

Various solutions exist to assist with proper setting and rigging of wheeled and tracked devices. With respect to rowing boats, there are roughly a dozen important variables that can be optimized, and their measurement and adjustment is described as "rigging". These watercraft involve sliding seats that position teams of individual rowers to provide force on oars in order to propel the watercraft through the water. The seats slide on wheels within tracks to allow the rower to use arms, legs and core strength to power the movement of the oars. In sweep rowing, where one oar is used per rower, as well as in sculling, where each rower controls two oars, the position of the oarlock is critical, since the oarlock restrains the oar but allows it to rotate with respect to the rower. Single oarlock pins at the side of each rower's position in a sweep boat or sets of pins in the sculling boat anchor the oarlocks to the boat. The measurement of the location of the oarlock pin to the center of the sweep boat is called the "spread", and the measurement of the distance between the pair of oarlocks from the center of each pin in a sculling boat is called the "span". The spread and span must be centered with respect to the boat and the rower.

Wheels that operate within tracks, generally, must be set to avoid unnecessary contact with the track in order to move evenly and efficiently therein. If they are out of adjustment, or set incorrectly, the wheels and track can rub together. In rowing watercraft, the rower's seat is mounted on four ball bearing wheels that roll in two concave tracks. If not properly positioned in the center of the track, the rub of the wheels causes unwanted friction, imposing axial load on the wheels. This causes the wheel bearings to wear more than if they were subject only to radial load. Wheels particularly, and track to a lesser extent, can wear out, becoming misshapen, uneven, and inefficient. With rowing boats, these components are expensive to replace, and in racing environments even small amounts of friction translates to drag and lost time. It requires greater effort by the rower and slows movement. Therefore, the rigging is critical, including the sliding seat and wheels relative to the rower and the oars, and the wheels relative to the track, as the wheels must be positioned correctly within the track to run evenly and maximize usable life.

Gauges have been described that measure the spread or span for rowing apparatus, including gauges that measure distance by mounting to the side of the boat or to the seat rails. However, existing devices and measuring instruments do not provide for accurate measurements in that they measure relative to parts of the rigging that do not capture true center of the spread and span. Rowing boat gauges that measure from the pin to the heal of a rowing shoe provide a setting relative to a rower's hip, which can negatively impact rigging, especially performance of the sliding seat. Rigger spread measuring instruments that provide sliding seat dimensions from or between gunnels also may not capture the center of the rower, the more critical point for rigging accurately. In racing environments this can have a relatively large effect on performance overall. Also, devices requiring sensors, lasers and other electronic equipment can have power or other technical constraints, particularly in wet settings. What is needed is a manually operated device and method that can assure dependable and precise rigging of both spread and span, including wheel and track position, measured from the center of the rower to minimize resistance and optimize performance.

BRIEF SUMMARY OF THE INVENTION

The invention disclosed herein is a gauge device, method of use and kit for calibration and accurate setting of equipment involving wheels within tracks. It provides for precise adjustment of the wheels within a track to minimize friction and assure the best performance.

In a preferred embodiment, the device comprises two rigid gauge bars connected by an adjustable scissor link. At one side of the scissor link near the end of each gauge bar, adjustable knobs are positioned which can be loosened or tightened in order to adjust the interval defined by the scissor link. The device further comprises a measuring gauge that extends out of the center of the scissor link and is held in place by a thumbscrew. The end of the barrel of the measuring gauge that extends outward has a slot or a section cut out of the top to provide a guide capable of positioning a tape measure, in order to help keep the tape measure secure when determining the spread of the boat. The two rigid gauge bars both have one or more apertures in the center to serve as connection points for the scissor link; this allows adjustment of the distance between the two bars, changing the interval defined by the scissor link. The scissor link keeps the gauge bars parallel at all times. Near the opposite end of each rigid gauge bar there are additional cuts that provide a location to precisely measure and adjust the location and position of the wheels relative to the track.

The method to measure the spread or span utilizes the tracks to locate the center point, which is then used to determine precise rigging. The cross pieces of the scissor link are the same length, so when assembled the scissor link maintains the gauge bars in parallel configuration with the measurement gauge at their center point, equidistant from each of the gauge bars. In this way, when the gauge bars are positioned within the tracks, the gauge identifies the center. The center point is then used as the reference point for rigging. Because the center point between the tracks is now identified, the location for the wheel settings is also defined. Using the method disclosed for wheel alignment herein, the wheels can be positioned correctly once the centerpoint is defined by adding or removing spacing components to adjust them relative to the tracks.

The invention disclosed is portable, and the device comprises a gauge that can be readily assembled and disassembled for use, transportation and storage. Once the device is assembled, knobs or other manually actuated securing components are adjusted to allow the device to measure and align a variety of wheeled and tracked devices, vehicles and particularly watercraft.

It is an object of this invention to provide a single, manually operated device for both measurement of rigging for proper setting of rowing components, and calibration of wheels within tracked systems to optimize performance and minimize wear on equipment.

It is another object of this invention to provide a device for precise measurement of both spread and span dimensions to optimize rigging in rowing watercraft.

It is a further object of this invention to provide a device for manually measuring and calibrating wheels within tracked systems to optimize performance and minimize wear on equipment.

It is a different object of this invention to provide a method of use with the device disclosed herein for precise measurement of spread and span dimensions in order to optimize rigging in rowing watercraft.

It is a separate object of this invention to provide a method for use with the device disclosed herein for calibrating and setting wheels so that they are aligned within the tracks, thereby optimizing performance and minimizing wear on equipment.

It is also an object of this invention to provide a manually operated device, method and kit for conveniently storing and transporting the device and accessories; the kit further comprises at least the spread, span and wheel alignment gauge disclosed herein, manually actuated securing components, tools, imperial and metric spacing components for adjusting the wheel spacing, and carry bag to keep and store the parts of the kit.

It is another object to provide a device for rigging and calibrating rowing equipment for use with the methods described herein, without the need for electricity, batteries, lasers, sensors, or external power.

REFERENCE CHARACTERS USED IN THE DRAWINGS

1. Gauge bar
2. Measurement guide
3. Measuring flat
4. Guide mount
5. Scissor link
6. Crosspiece
7. Ball knob
8. Thumbscrew
9. Wheel slot
10. Scissor link slot
11. Fastener pin
12. Track
13. Sliding seat

DETAILED DESCRIPTION OF THE INVENTION

The following description of the drawings explains and further defines the invention disclosed with reference to each of the drawings. The figures and drawings form part of the present specification and are included to further demonstrate certain aspects of the present claimed subject matter, and should not be used to limit or define the present claimed subject matter.

The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings. It should be appreciated that the present invention encompasses multiple inventive concepts that may be embodied in a variety of contexts. This detailed description, read in conjunction with the accompanying drawings, is merely illustrative and is not to be taken as limiting the scope of the invention, as it would not be practical to include all of the possible embodiments and contexts of the invention.

Figure 1:
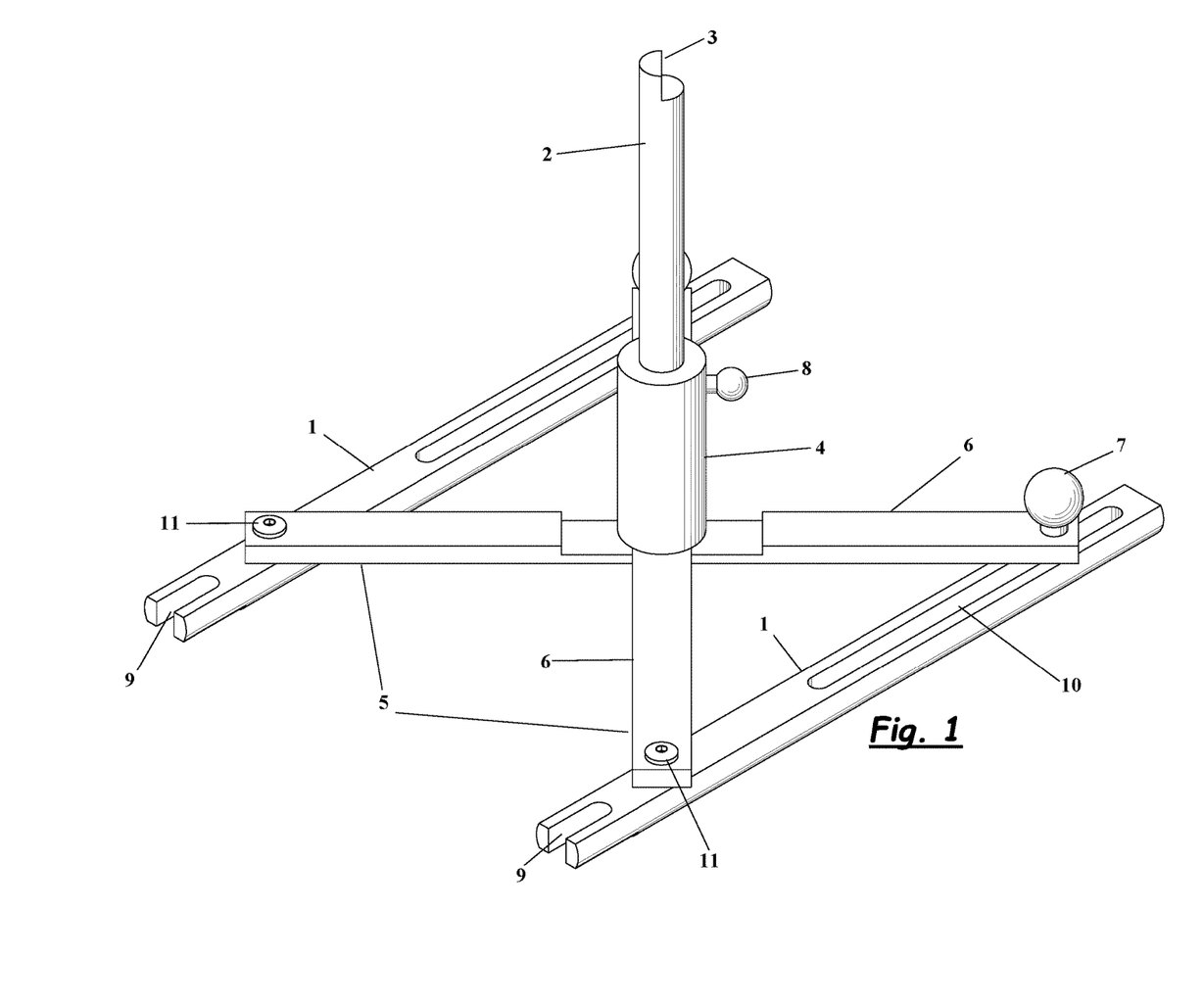
FIG. 1 is an isometric view of the invention.

FIG. 1 shows an isometric view of the assembled device in a preferred embodiment. In this figure, two gauge bars 1 are releasably connected to a scissor link 5. The scissor link 5 further comprises two crosspieces 6, connected at their center point such that they can swing, bringing their ends closer together or farther apart.

Since the device is designed to be portable, the various parts are connected via fasteners or securing components that can be readily engaged or released; these securing components may be threaded or non-threaded, and are capable of insertion into or through the various apertures of the device. They are sized and shaped according to the specific securing function of the device, and may include but are not limited to thumbscrews 8, ball knobs 7, fastener pins, head cap or other screws, shoulder or other bolts and bushings; the term "manually actuated securing components" in this disclosure refers to these collectively. The gauge bars 1 are connected to the scissor link 5 cross pieces via manually actuated securing components. In the preferred embodiment shown, the securing components are fastener pins aligned with and passing through countersunk holes in a first crosspiece 6 of the scissor link 5 and connect it with a gauge bar 1 that is located proximate to a wheel slot 9 located in and passing through one end of the gauge bar 1.

At the other end of each gauge bar 1, a scissor link slot 10 running lengthwise from a short distance from the end up the gauge bar 1 to approximately its center allows for a manually actuated securing component to moveably position the scissor link 5 by setting and fastening it at the desired location within the scissor link slot 10. In the embodiment shown, this securing component is a ball knob 7.

A guide mount 4 is connected to the scissor link 5 at the center point where its crosspieces 6 are connected. A measurement guide 2, inserted within the guide mount 4, is removeable and positionable, where positionable refers to capable of being slidably moved and secured, and is placed within an aperture in the guide mount 4. In the embodiment shown in FIG. 1, a thumbscrew 8 passing through a subsequent aperture in the guide mount 4 is tightened or loosened to restrain or release the measurement guide 2 to allow movement up or down, or to secure it. When fully assembled, the measurement guide 2 is secured within the guide mount 4 perpendicular to the scissor link 5 and gauge bars 1. It positions and stabilizes the measuring flat 3 at the correct location to accurately catch and hold a measuring tape for rigging. The measuring tape could be any standard and commercially available tape measure or measuring device.

Figure 2:
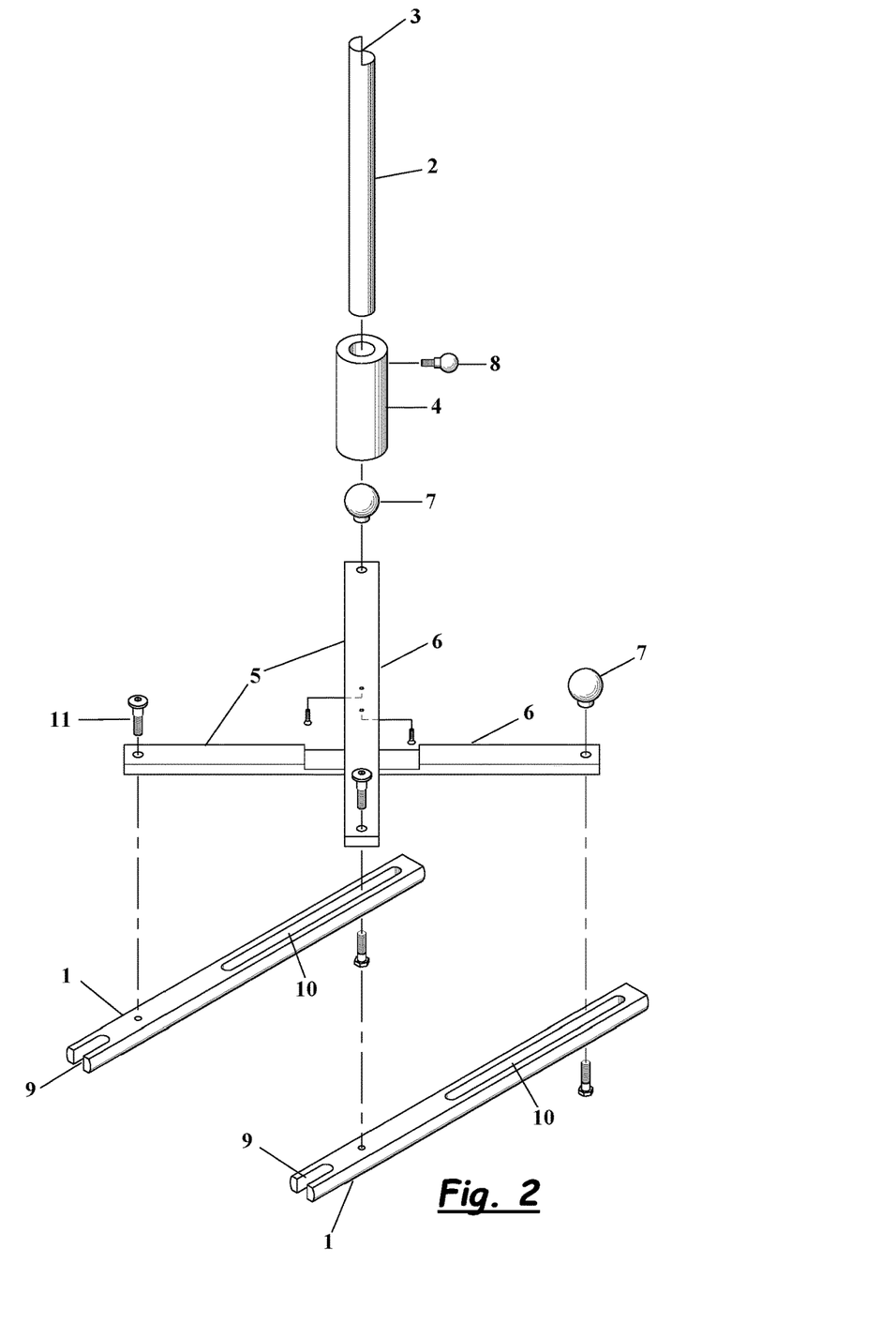
FIG. 2 is a perspective view of the device disclosed in this invention, showing the various parts and their corresponding locations on the device.

In FIG. 2, a perspective view of the device is presented, showing the various parts disassembled, and their corresponding locations on the device when assembled. The device is intended to be portable, and manual operation and minimal parts are by design. The invention's kit is compact and easily stored and transported. The individual parts are easy to assemble; the kit comprises but is not necessarily limited to: manually actuated, threaded or non-threaded securing components including thumbscrews 8, ball knobs 7, fastener pins 11, screws, bolts and bushings capable of insertion into or through the various apertures of the device; tools, comprising but not limited to a tape measure, light, screwdrivers, wrenches for imperial and metric bolts; and imperial and metric spacing components for adjusting the wheel spacing; and a carry bag to keep and store the parts of the kit. The device can be understood further in connection with this figure with the following assembly method; it will be understood and recognized that the steps are presented only so as to provide a complete description of the parts, and the steps described here could be undertaken in any order variation and still be contemplated by the disclosure herein.

At the top of FIG. 2, the measurement guide 2 is shown. It is placed into an aperture in the guide mount 4, and secured therein with a manually actuated securing component; apertures and securing components can be either threaded or non-threaded. In the embodiment depicted, securing the measurement guide 2 within the guide mount 4 is accomplished using a thumbscrew 8 positioned in an aperture in the guide mount 4 that can be released to allow the measurement guide 2 to slide up or down in the guide mount 4, then tightened to maintain the position for measuring. The guide mount 4 is then secured to the scissor link 5. The scissor link 5 comprises at least a first and a second separate crosspiece 6, containing a plurality of apertures for connecting the crosspieces 6 to the device. Each crosspiece 6 further comprises at least two sides, a flat side and a side with a cutaway, such that when assembled, the sides of the crosspiece 6 with the cutaway face each other and are in contact at their center. The cutaways extend evenly from the center of the crosspiece 6 outwardly in both directions. Each crosspiece 6 also comprises at least two opposing ends. One or more manually actuated securing components are positioned to maintain the contact between the cutaway faces, while allowing the crosspieces 6 to rotate from the center so that the crosspiece 6 ends can move closer together or further apart, changing the distance between the center point and the gauge bars 1 and also the interval between the ends of the two crosspieces 6 relative to each other. In this way, the scissor link 5 moves the gauge bars 1 closer to the center or farther apart, allowing the gauge bars 1 to be positioned within tracks 12 that are of varying distances apart. Readily adjustable manually actuated securing components such as ball knobs 7 (as shown in the embodiment depicted) connect the first ends of each of the crosspieces 6 of the scissor link 5 with the gauge bars 1 by traversing the scissor link slot 10 and attaching to cap screws, shoulder bolts or other fasteners which extend outward beyond the scissor link slot 10 and are capable of positionably securing the scissor link 5 to the gauge bars 1. The second ends of each of the crosspieces 6 of the scissor link 5 are secured to the gauge bars 1 and tightened to hold their position. Therefore, the first ends of each of the scissor link 5 can be easily adjusted by loosening the ball knobs 7 or other securing components of the first end while the second end remains anchored to the gauge bars 1. The crosspiece 6 ends move together or apart, closing or expanding respectively the interval between each crosspiece 6 end, thereby changing the distance between the gauge bars 1.

Figure 3:
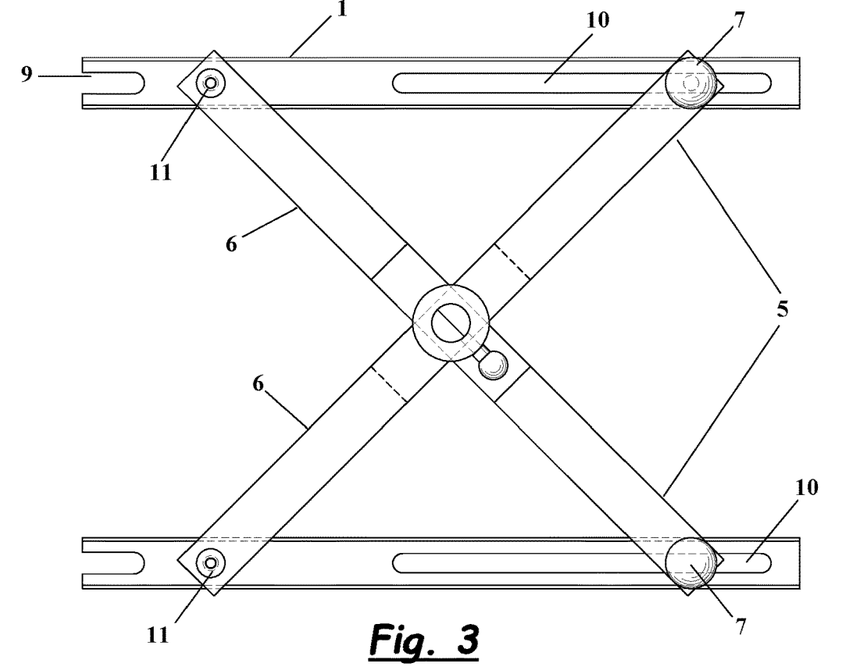
FIG. 3 is a top plan view of the device of the invention.

FIG. 3 is a top plan view of the device of the invention, illustrating the connected crosspieces 6 of the scissor link 5, and their connection to the gauge bars 1. At the first end, the crosspieces 6 are removeably fastened with a manually actuated securing component such as a ball knob 7, which can be easily grasped by hand and adjusted without the need for additional tools. Apertures located proximately to the wheel slot 9 near the second end of the crosspieces 6 provide space for a fastening component such as a fastener pin 11 to pass through and connect with the gauge bars 1. The measurement guide 2 is positionably secured within the guide mount 4 with a thumbscrew 8 or similar releasable fastener; the guide mount 4 is vertically secured at a right angle to the scissor link 5 at its center.

Figure 4:
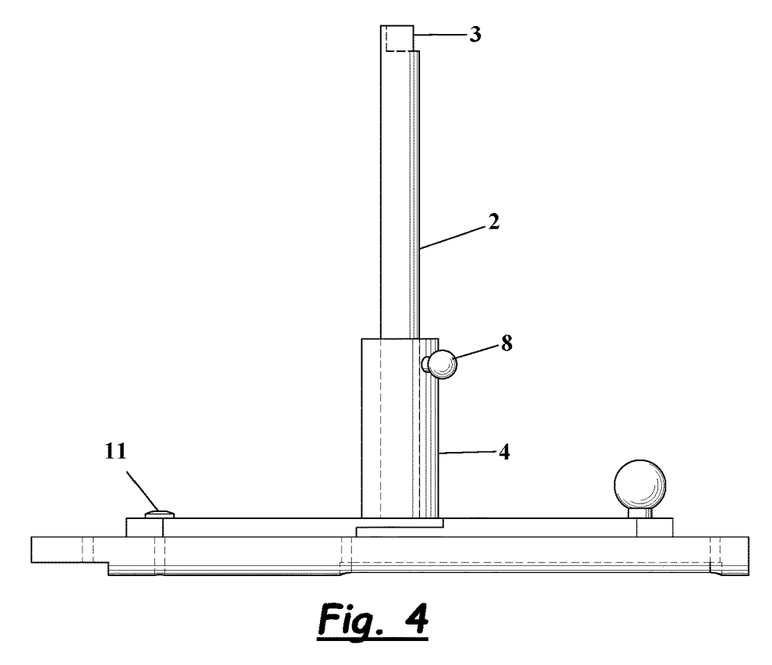
FIG. 4 is a side elevational view of the device of the invention.

In FIG. 4, a side view of the device of the invention is shown. The positionable measurement guide 2 further comprises a rigid and slidable barrel; in the preferred embodiment depicted in the figures, the measurement guide 2 and guide mount 4 are cylindrically configured. However, one skilled in the art would recognize that any sufficiently rigid and slidable shape including but not limited to triangular, trapezoidal, ovate, etc., would be operational and contemplated herein. The measurement guide 2 barrel includes at least a first end proximal to and capable of insertion into the guide mount 4, and a second end distal to the measuring guide mount 4. The measurement guide 2 further comprises a measuring flat 3 at this distal end, wherein a portion of the barrel is cut away to provide a flat spot to catch and hold a measuring tape hook (the blade portion at the end of the measuring tape for holding the tape measure in position for measuring). The cut away could be replaced with a slot or other structure or configuration capable of holding the measuring tape hook. Furthermore, the measurement guide 2 mount includes apertures that may be threaded or non-threaded, to support fastening components. Such fastening components include at least a measurement guide fastener to secure the measuring guide 2 within the guide mount 4; fasteners for the measurement guide 2 and attachment of the various components of the device could include but are not limited to thumbscrews 8, ball knobs, fastener pins, head cap screws, shoulder bolts and bushings.

The guide mount 4 is attached by fastening components to the scissor link 5, and positions the measuring guide at a right angle at the very center of the device. It includes a plurality of apertures for fastening components to be threaded into or passed through and secured therein for attaching the guide mount 4 to the scissor link 5, the measurement guide 2 positionally inside the guide mount 4, and for thumbscrews 8 or other manually actuated securing components capable of insertion into the apertures to assemble the device. Ball knobs 7 or other manually actuated securing components pass through the scissor link slots 10 and then through apertures on the gauge bars 1, aligning the scissor link slots 10 with the gauge bar 1 but allowing the crosspieces 6 of the scissor link 5 to slidably rotate from the center point. This provides for the gauge bars 1 to be moved closer together or farther apart so that they can be placed within the tracks 12, serving to mark the distance between the tracks 12 and also provide an exact center point between the tracks 12 from which to measure rigging.

Figure 5:
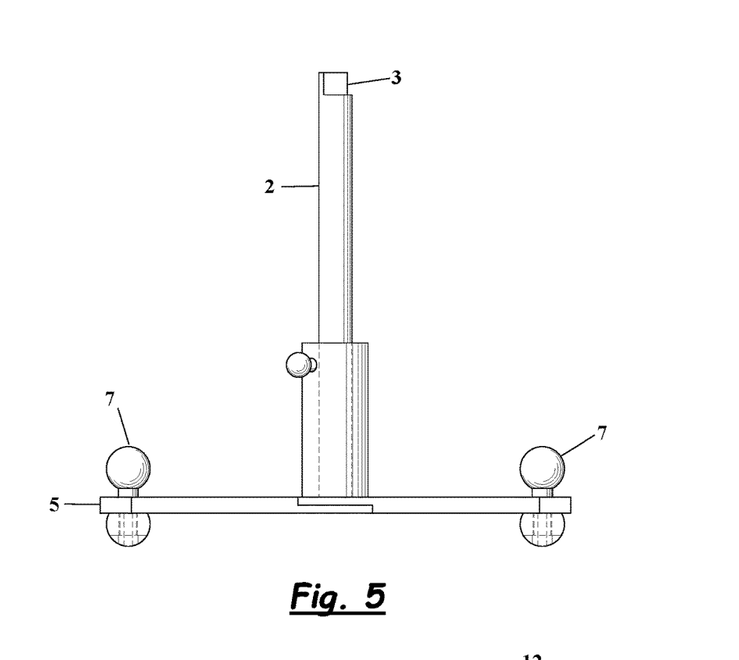
FIG. 5 is a side elevational view of the device of the invention from a side adjacent to the side shown in FIG. 4.

FIG. 5 is a side view of the invention from a side adjacent to the side shown in FIG. 4. The cutaway portion of each of the crosspieces 6 face each other so that when assembled, the separate crosspieces 6 of the scissor link 5 are essentially coplanar on both sides. In the embodiment shown, ball knobs 7 pass through apertures in the crosspieces 6 and the scissor link slots 10 such that when tightened, the scissor link 5 is in contact with and removeably attached to the gauge bars 1. The guide mount 4 extends upward from the center of the scissor link 5, and the measurement guide 2 is placed and supported within and is removeably positionable relative to the guide mount 4. The measurement guide 2 can be rotated so that the measuring flat 3 can position and hold a measuring tape in any direction for rigging or measurement in any orientation with a fixed location at the center of the tracks 12.

Figure 6:
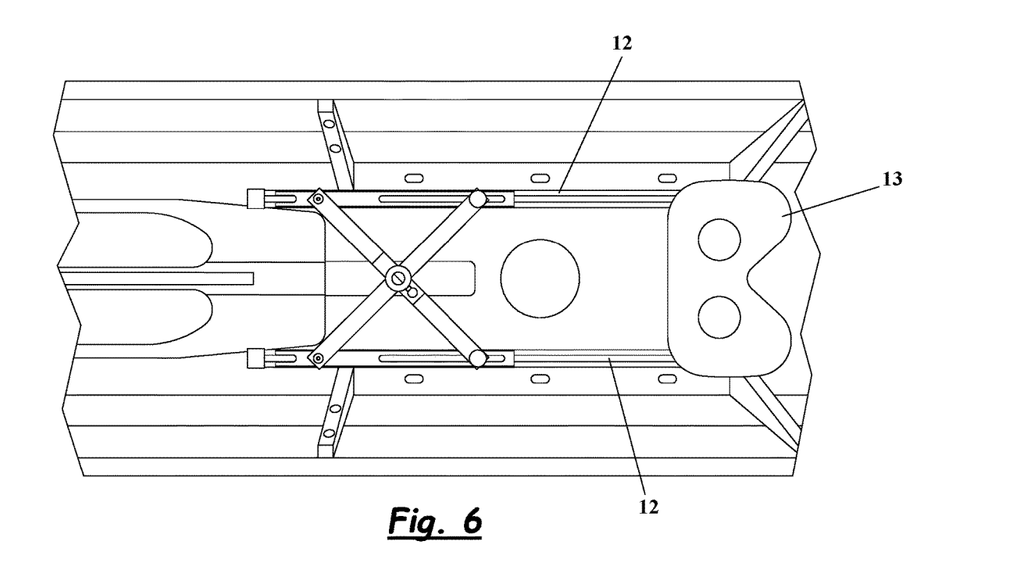
FIG. 6 is a view of the device of the invention positioned in the wheel tracks of a rowing boat.

FIG. 6 shows the device positioned for measuring and rigging within the wheel tracks 12 of a rowing boat (the rowing boat is not part of the invention disclosed herein). The fully assembled device is placed with the gauge bars 1 parallel and within the wheel tracks 12 of the boat. One skilled in the art would appreciate that this is merely one embodied use of the invention; the device and method would function to measure and calibrate a wide variety of wheeled and tracked devices or vehicles.

The device is capable of checking the wheel to track 12 position, using, generally, the following method; variations in the sequence of the steps is contemplated and within the scope of this invention disclosure. In a rowing watercraft, the seat is removed from the tracks on the position that the seat wheel to seat track alignment is to be gauged and adjusted. The device is assembled and placed in the wheel tracks 12 so that the wheel slots 9 on the gauge bars 1 are facing the stern end of the boat, then manually actuated securing components are tightened and set. The device is removed from the tracks and the seat wheels are positioned to fit in the wheel slots 9 in the device. If the seat wheels do not easily slide into the slots in the gauge bars 1, then the wheel spacing must be adjusted. If the seat wheel spacing is not correct, premature wheel wear will occur as will premature track wear. Rowing efficiency will also suffer due to the additional friction losses if the seat to track spacing is incorrect. If the wheels are too close together, manually actuated spacing components including but not limited to shims, bolts or washers, must be installed between the wheels and the seat frame until the wheels are able to slide into the open slots in the gauge bars 1. If the wheels are too far apart, one or more of the spacing devices must be removed from between the wheels and the seat frame until the wheels are able to slide into the open slots in the gauge bars 1. The method is then repeated for each seat wheel to seat track 12 position to be gauged and adjusted.

The device is also capable of measurement for setting various rigging positions, using, generally, the following method; variations in the sequence of the steps is contemplated and within the scope of this invention disclosure. The device is assembled, and the fasteners connecting the component parts are loosened. The gauge bars 1 are spread apart or pulled together so that they can be placed within and conform to the position of wheel tracks 12 and set by manually adjusting and tightening knobs. The measurement guide 2 is raised or lowered to the height of the oarlock pin or pins, then rotated to align the measurement guide 2. A thumbscrew 8 or similar securing component is then tightened to secure the measurement guide 2 in this position. Once secure, a measuring tape is connected to the measurement guide 2 using the tape measure hook at the end of the measurement guide 2 and the distance from the center of the boat to the oarlock pin is determined.

I claim:

1. A measurement and calibration device for wheeled and tracked apparatus, vehicles, and simulators thereof, comprising: a positionable measurement guide; a guide mount; a scissor link further comprising a plurality of crosspieces removeably and adjustably affixed perpendicular to said measuring guide mount; manually actuated securing components; spacing components; one or more gauge bars conforming to and capable of insertion into wheel tracks and releasably attachable to said plurality of crosspieces.

2. The device of claim 1, wherein the positionable measurement guide further comprises a rigid and slidable barrel, wherein said barrel includes a first end proximal to and capable of insertion into a guide mount, and a second end distal to said guide mount; said second end further comprises a measuring flat or slot capable of holding a measuring tape hook.

3. The device of claim 2, wherein the measurement guide barrel is cylindrical.

4. The device of claim 1, wherein the guide mount further comprises a first aperture conforming to and capable of containing and supporting the measurement guide; a measurement guide fastener capable of insertion into a subsequent aperture within the guide mount in contact with the measurement guide to allow the measurement guide to be releasably raised or lowered and secured therein with said measurement guide fastener; one or more additional threaded or non-threaded apertures passing through the measurement guide mount capable of reversibly supporting and securing manually actuated fastening components; and one or more additional threaded or non-threaded fastening components capable of insertion into said subsequent threaded or non-threaded apertures to releasably attach the parts of the device such that it can be assembled and disassembled for use, storage or transportation.

5. The device of claim 1, wherein the scissor link comprises a plurality of crosspieces; said plurality of crosspieces includes at least a first crosspiece and a second crosspiece, and each crosspiece further comprises at least: a flat side and a side with one or more cutaways extending evenly from the center of the crosspiece outwardly in both directions; apertures for one or more manually actuated securing components; and manually actuated securing components capable of releasably and adjustably attaching the one or more crosspieces to each other, to one or more gauge bars and also capable of releasably and adjustably attaching the one or more crosspieces to the guide mount.

6. The device of claim 1, wherein the one or more gauge bars are sized and shaped to conform to and fit within wheel tracks; each gauge bar further comprises a rigid member including at least one wheel slot with an open end, at least one scissor link slot passing through the gauge bar, and threaded or non-threaded apertures for positioning manually actuated securing components that attach the gauge bar to the crosspieces of the scissor link.

7. The device of claim 1 wherein the manually actuated securing components are selected from the group consisting of threaded or non-threaded thumbscrews, ball knobs, fastener pins, screws, bolts and bushings capable of insertion into or through the various apertures of the device.

8. A kit to use, store and transport the measurement and calibration device of claim 1, wherein the kit further comprises:
   i. the device of claim 1;
   ii. manually actuated securing components capable of insertion into or through the various apertures of the device, selected from the group consisting of threaded or non-threaded fastener pins, thumbscrews, ball knobs, screws, bolts and bushings;
   iii. tools, from the group consisting of a tape measure, light, screwdrivers, wrenches for imperial and metric bolts;
   iv. imperial and metric spacing components for adjusting the wheel spacing; and
   v. a carry bag to keep and store the parts of the kit.

9. A method of (a) measuring and setting rigging components, and (b) calibrating and aligning wheels in tracked apparatus and vehicles using the measurement and calibration device of claim 1, comprising the steps of:
   i. Unpacking the device components from a kit;
   ii. assembling the device by manually positioning and releasably connecting the parts of the device with manually actuated securing components, such that: the gauge bars are connected to the scissor link; the gauge mount is connected to the scissor link at the center of each of the scissor link's crosspieces; the crosspieces are configured such that the sides of each crosspiece with a cutaway face each other and are in contact at their center; and the measurement guide is positioned in the guide mount at the center point between and vertically positioned relative to the gauge bars with a measurement flat at the end distal to the guide mount;
   iii. loosening the manually actuated securing components slightly on the device to allow the gauge bars to move relative to each other and moving them either together or apart to appropriately position the gauge bars of the device to fit within the tracks; and
   iv. measuring and setting the rigging from the center point of the device, or calibrating and aligning wheels by adding or removing spacing with manually actuated spacing components.

10. The method of claim 9, wherein measuring and setting the rigging further comprises the following steps:
   I. from the assembled position, assure that the measurement guide is placed such that an end of the guide with a measurement flat is distal to and is opposite of the side in the measurement guide mount, and secure it with a manually actuated securing component in line with the oarlock pin or at a height relevant to the desired calibration or rigging;
   II. position the device such that the open slots on the gauge bars are facing the stern end of a boat and a side of the device with ball knobs are located at the bow end, and place the device at a location within the tracks where measurements and rigging are desired;
   III. measure and calibrate with a measuring tape and set appropriately for span or sweep measurements.

11. The method of claim 10, wherein span measurements are set on a sculling boat and further comprise the following steps:
   i. Place a measuring tape to lie on top of each oarlock pin, then position the device so the measurement guide is directly in line with the measuring tape;
   ii. loosen the manually actuated securing component and raise or lower the measurement guide until the measurement flat is at the same level as the measuring tape;
   iii. hold the measurement guide, loosen the manually actuated securing component and rotate the measurement guide so that the measurement flat is perpendicular to the measuring tape and tighten the manually actuated securing component;
   iv. hook the end of the measuring tape onto the measurement flat and extend the measuring tape out to the center of the oarlock pin; the tape measure will give a direct measurement of a first one-half of the span;
   v. to measure the half span of the other oarlock pin hold the measurement guide, loosen the manually actuated securing component, rotate the measurement guide 180° and tighten the manually actuated securing component;
   vi. hook the tape measure tape onto the measurement flat and extend the tape measure tape out to the other oarlock pin; the tape measure will give a direct measurement of the second one-half of the span;
   vii. if both the first one-half and second one-half span measurements are not the same, then the span is not centered with respect to the rower and is adjusted accordingly; and
   viii. repeat this procedure for each rowing position to be measured and adjusted.

12. The method of claim 10, wherein spread measurements are set on a sweep boat and further comprise the following steps:
   i. position the device so the measurement guide is directly in line with the oarlock pin such that a line joining the oarlock pin and the measurement guide would be at 90° to the boat's keel;
   ii. loosen the manually actuated securing component and raise or lower the measurement guide until the measurement flat is at the same level as the top of the oarlock pin;
   iii. rotate the measurement guide so that the measurement flat is perpendicular to a line joining the oarlock pin and the measurement guide whereby the flat is in line with the keel of the boat so as to allow a measuring tape to be hooked on the measurement flat and tighten the manually actuated securing component;
   iv. hook the measuring tape onto the measurement flat and extend the tape measure tape out to the center of the oarlock pin; the tape measure will give a direct measurement of the spread, and can be adjusted accordingly; and
   v. repeat this procedure for each rowing position to be measured and adjusted.

13. The method of claim 9, wherein calibrating and aligning wheels further comprises the following steps:
   I. remove the seat from the tracks on the position along the track that the wheel to track alignment is to be gauged and adjusted;

II. position the device so that open slots on the gauge bars are facing the stern end of the boat;
III. loosen manually actuated ball knobs on the device to allow the gauge bars to move relative to each other;
IV. position the device over the tracks at the position to be adjusted and aligned;
V. manually adjust the gauge bars by either spreading them apart or pulling them closer together so that each gauge bar will align and be positioned within the track;
VI. tighten both ball knobs to secure the device in this position;
VII. remove the device from the tracks;
VIII. position the seat so that the seat wheels align with the open slots on the device and attempt to fit the wheels into the slots; wherein
   a. if the wheels are too close together, install spacing components between the wheels and the seat frame until the wheels are able to slide into the open slots in the gauge bars; and
   b. if the wheels are too far apart, remove spacing components from between the wheels and the seat frame until the wheels are able to slide into the open slots in the gauge bars; and
IX. repeat the above procedure for each wheel to track position to be gauged and adjusted.

* * * * *